(12) United States Patent
Dakshinamurthy et al.

(10) Patent No.: US 9,167,514 B2
(45) Date of Patent: Oct. 20, 2015

(54) UNEQUAL AMPLIFIER GAIN COMPRESSION VIA SHAPING TABLE

(71) Applicant: Broadcom Corporation, Irvine, CA (US)

(72) Inventors: Sriraman Dakshinamurthy, San Jose, CA (US); Bongseok Park, Pleasanton, CA (US); Ying Xia, Saratoga, CA (US); Robert Gustav Lorenz, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 17 days.

(21) Appl. No.: 13/922,924

(22) Filed: Jun. 20, 2013

(65) Prior Publication Data

US 2014/0155128 A1 Jun. 5, 2014

Related U.S. Application Data

(60) Provisional application No. 61/804,870, filed on Mar. 25, 2013, provisional application No. 61/732,780, filed on Dec. 3, 2012.

(51) Int. Cl.
*H04B 1/38* (2015.01)
*H04W 52/02* (2009.01)

(52) U.S. Cl.
CPC ............ *H04W 52/0209* (2013.01); *Y02B 60/50* (2013.01)

(58) Field of Classification Search
CPC ............ H04W 52/02; H04W 52/0229; H04W 52/0225; H04W 52/028; H04W 52/52; H03G 3/3052; H03G 3/3068; H03G 3/22; H03F 3/24; H03F 2200/451; H03F 1/3247

USPC ................ 455/115.1, 120–126, 127.1, 127.2, 455/127.5, 574; 375/300, 302
See application file for complete search history.

(56) References Cited

U.S. PATENT DOCUMENTS

| | | |
|---|---|---|
| 6,674,856 B1 | 1/2004 | Hendricks et al. |
| 7,482,869 B2 | 1/2009 | Wilson |
| 7,764,060 B2 | 7/2010 | Wilson |
| 7,868,698 B2 | 1/2011 | Wilson |
| 8,093,945 B2 | 1/2012 | Wimpenny |
| 8,093,946 B2 | 1/2012 | Wimpenny et al. |
| 8,093,979 B2 | 1/2012 | Wilson |

(Continued)

OTHER PUBLICATIONS

Behravan, Ali, et al., Adaptive Predistorter Design for Nonlinear High Power Amplifiers, Chalmers University of Technology, Göteborg, Sweden, 2003, 4 pages.

(Continued)

*Primary Examiner* — Nhan Le
(74) *Attorney, Agent, or Firm* — Brinks Gilson & Lione

(57) ABSTRACT

A communication device, such as a smart phone, includes an envelope tracking power supply that provides a voltage supply signal for a power amplifier. The envelope tracking signal input to the envelope tracking power supply arises from application of a shaping table on a desired transmit signal. The shaping table implements non-uniform gain compression across a range of output powers, and in particular may aggressively compress the power amplifier for low output powers, and less aggressively compress the power amplifier at high output powers. The non-uniform gain implemented via the shaping table may provide significant power savings, while still allowing the transmitter to meet spectral mask requirements.

20 Claims, 7 Drawing Sheets

(56) References Cited

U.S. PATENT DOCUMENTS

| | | | |
|---|---|---|---|
| 8,106,713 | B2 | 1/2012 | Wilson |
| 8,169,261 | B2 | 5/2012 | Wilson |
| 8,294,522 | B2 | 10/2012 | Flint et al. |
| 8,319,570 | B2 | 11/2012 | Wilson |
| 8,903,342 | B1* | 12/2014 | Wyse et al. ............ 455/234.1 |
| 2009/0097591 | A1* | 4/2009 | Kim ............................ 375/297 |
| 2012/0270511 | A1 | 10/2012 | Dakshinamurthy et al. |

OTHER PUBLICATIONS

Dahlman, Erik, et al., Key features of the LTE radio interface, Ericsson Review No. 2, 2008, 4 pages.

Le Gallou, Nicolas, et al., Over 10MHz Bandwidth Envelope-Tracking DC/DC converter for Flexible High Power GaN Amplifiers, 2011 IEEE MTT-S International Microwave Symposium, Baltimore, Maryland, 2011, 4 pages.

LTM 9003, 12-Bit Digital Pre-Distortion μModule Receiver Subsystem, Linear Technology Corporation, Milpitas, California, downloaded May 2013, 24 pages.

Schow, C.L., et al., Transmitter Pre-Distortion for Simultaneous Improvements in Bit-Rate, Sensitivity, Jitter, and Power Efficiency in 20 Gb/s CMOS-driven VCSEL Links, Optical Society of America, 2011, 3 pages.

Basic PA Linearization Concepts: Predistortion Techniques vs. Operation in Backoff, Scintera Networks, Inc., 2009-2011, 3 pages.

Seydou, N., Efficient Digital Baseband Predistortion for Modern Wireless Handsets, Georgia Institute of Technology, Dec. 2009, 133 pages.

GC5322, Wideband Digital Pre-Distortion Transmit IC Solution, Texas Instruments Incorporated, 2008, 4 pages.

GC5325, Wideband Digital Predistortion Transmit Processor, Texas Instruments Incorporated, 2009, 24 pages.

GC5328, Low-Power Wideband Digital Predistortion Transmit Processor, Texas Instruments Incorporated, 2009, 27 pages.

Verfaillie, G., White paper Equalising and Predistortion: The Equalink™ concept, Newtec Cy N.V., 2008, 8 pages.

* cited by examiner

UNEQUAL AMPLIFIER GAIN COMPRESSION VIA SHAPING TABLE

CROSS REFERENCE TO RELATED APPLICATIONS

This application claims priority to U.S. Provisional Application Ser. No. 61/732,780, filed 3 Dec. 2012, which is incorporated by reference in its entirety. This application also claims priority to, and incorporates by reference, U.S. Provisional Application Ser. No. 61/804,870, filed 25 Mar. 2013.

TECHNICAL FIELD

This disclosure relates to signal transmission. This disclosure also relates to the transmit circuitry in user equipment such as cellular telephones and other devices.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Furthermore, past estimates have indicated that (as just three examples) the United States, Italy, and the UK have more mobile phones in use in each country than there are people even living in those countries. Improvements in wireless communication devices, particularly in their ability to reduce power consumption, will help continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
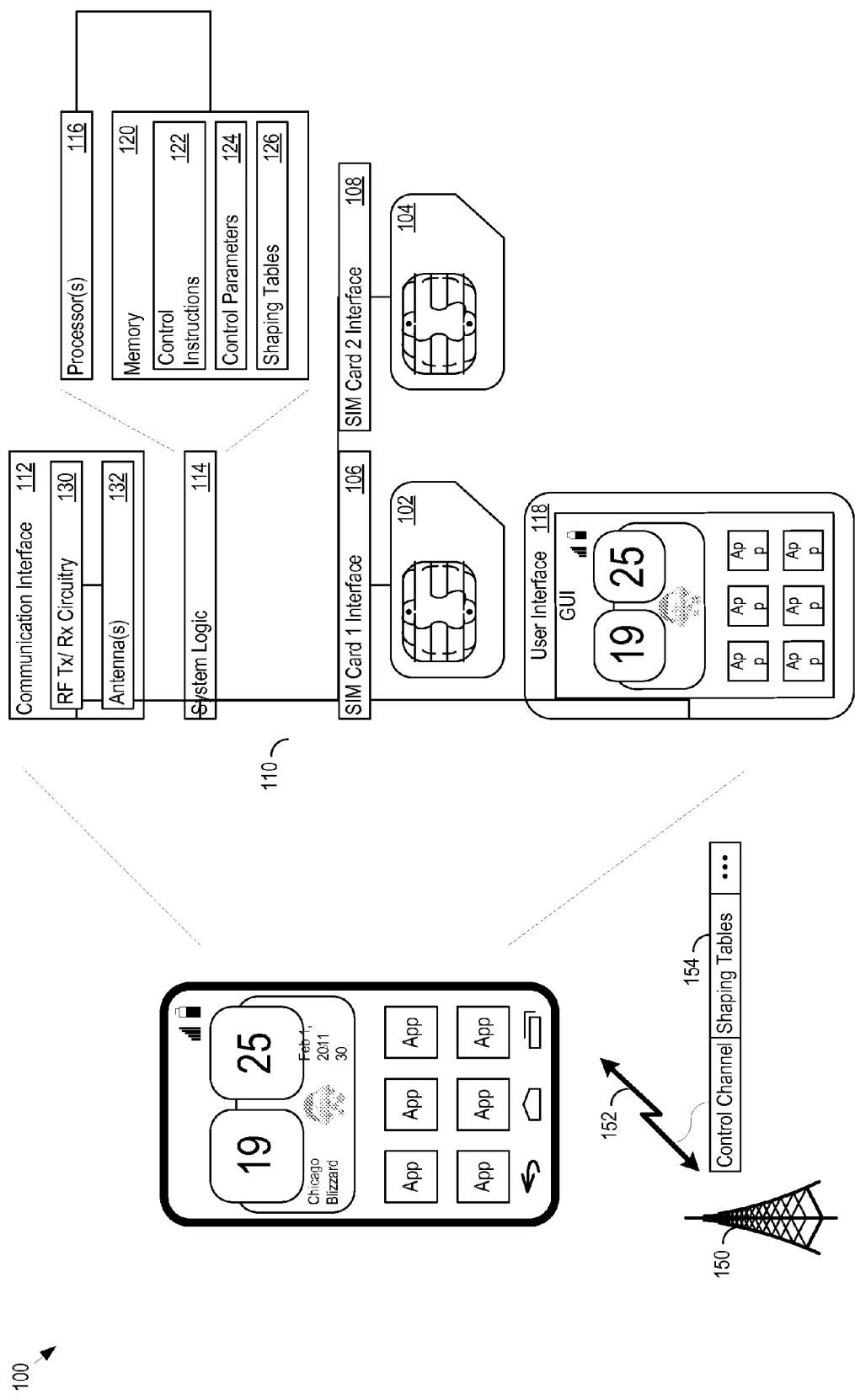
FIG. 1 shows an example of user equipment that includes a transmit and receive section.

The discussion below makes reference to user equipment (UE). UE may take many different forms and have many different functions. As one example, UE may be a 2G, 3G, or 4G/LTE cellular phone capable of making and receiving wireless phone calls, and transmitting and receiving data. The UE may also be a smartphone that, in addition to making and receiving phone calls, runs any number or type of applications. UE may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in other devices, such as a base station or other network controller that communicates with the UE.

As an introduction to the techniques described in more detail below, the UE may include a controller and a shaping table. The shaping table maps an input signal to an envelope tracking power supply reference signal. An envelope tracking power supply generates a voltage supply signal for a power amplifier that approximates the envelope of the reference signal. The controller implements an input/output relationship in the shaping table such that the envelope tracking power supply reference signal causes unequal gain compression in the power amplifier across a specified range transmit signal amplitudes.

Said another way, the UE may include a shaping table that generates, from an input signal, an envelope tracking signal characterized by a signal envelope. An envelope tracking power supply receives the envelope tracking signal and produces a voltage supply signal for a power amplifier that approximates the signal envelope. A controller establishes an input/output relationship for the shaping table that causes unequal gain compression for the amplifier across a range of transmit signal amplitudes.

In more detail, a UE may include a baseband controller that determines an input/output relationship that causes unequal gain compression across a specified range of transmit signal amplitudes, and that also prepares a transmit signal for transmission. A shaping table in communication with the baseband controller implements the input/output relationship and produces, from the transmit signal, an envelope tracking signal characterized by a signal envelope according to the input/output relationship. An envelope tracking power supply receives the envelope tracking signal and outputs a power supply voltage signal that approximates the signal envelope. A power amplifier receives the power supply voltage signal and drives a transmit antenna, while a radio frequency (RF) driver between the baseband controller and the power amplifier receives a gain compensated version of the transmit signal and drives the power amplifier with a driving signal generated from the gain compensated version of the transmit signal. Signal adaptation logic, such as digital pre-distortion logic, may create the gain compensated version of the transmit signal for the RF driver.

Turning now to FIG. 1, that figure shows an example of a UE 100 in communication with a network controller 150, such as an enhanced Node B (eNB) or other base station. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the UE 100. In that regard, the system logic 114 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 may include a graphical user interface, touch sensitive display, voice or facial recognition inputs, buttons, switches, speakers and other user interface elements.

In the communication interface 112, Radio Frequency (RF) transmit (Tx) and receive (Rx) circuitry 130 handles transmission and reception of signals through the antenna(s) 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the user equipment 100, are available from Broadcom Corporation of Irvine Calif.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 112 may support transmission and reception under the 4G/Long Term Evolution (LTE) standards. The techniques described below, however, are applicable to other communications technologies whether arising from the 3rd Generation Partnership Project (3GPP), GSM® Association, Universal Mobile Telecommunications System (UMTS), High Speed Packet Access (HSPA)+, or other partnerships or standards bodies.

The system logic 114 may include one or more processors 116 and memories 120. The memory 120 stores, for example, control instructions 122 that the processor 116 executes to carry out any of the processing or control functionality described below, operating in communication with the circuitry in the communication interface 112. For example, the system logic 114 may reprogram, adapt, or modify parameters or operational characteristics of the logic in the communication interface 112 and in the system logic 114 itself. The system logic 114 may make adaptations to, as a specific example, a shaping table, whether the shaping table is implemented in or by the system logic 114 or in or by the communication interface 112.

The control parameters 124 provide and specify configuration and operating options for the control instructions 122. As will be explained in more detail below, the memory 120 may also store one or more shaping tables 126. More specifically, the memory 120 may store one or more data sets (optionally arranged or indexed as a library of data sets) that represent different shaping table input/output relationships. As will be explained in more detail below, the input/output relationships govern how the shaping table transforms a desired transmit signal into an envelope tracking reference signal for an envelope tracking power supply.

As noted above, the UE 100 is in communication with the network controller 150 over one or more control channels 152. The network controller 150 sends messages to the UE 100 over the control channels 152. The messages may include operating parameters 154, such as power control parameters, bandwidth allocation parameters, and other operating parameters. In some implementations, the network controller 150 may send new shaping tables to the UE 100 to store in the memory 120, or for entry into the library of shaping tables 126. The new shaping tables may, for instance, provide alternate non-iso gain compression shaping tables for the UE 100 to choose from during operation.

Figure 2:
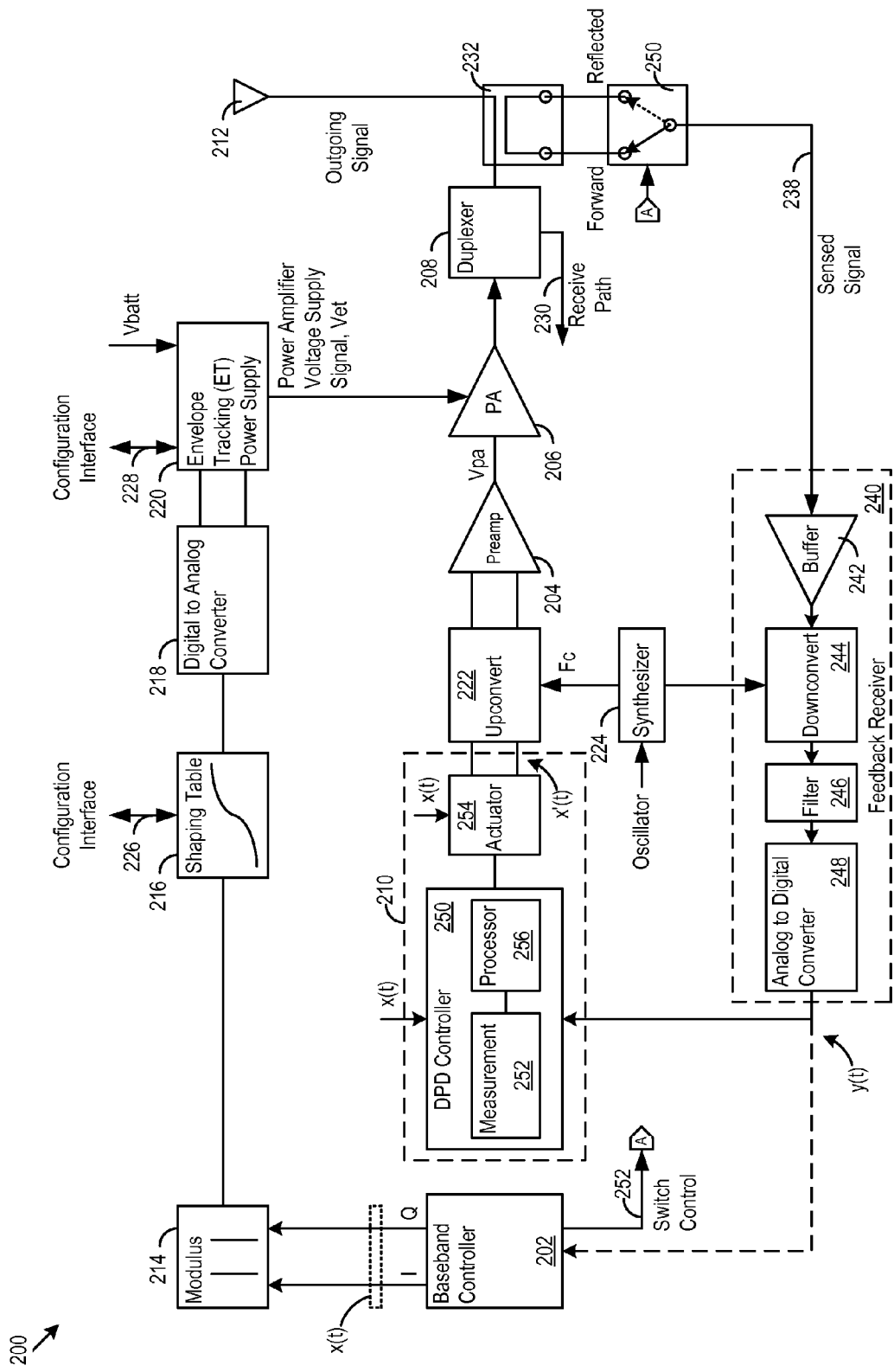
FIG. 2 is an example of a transmit and receive section.

FIG. 2 shows an example of transmit/receive logic 200 that may be present in the user equipment 100. The logic 200 may be implemented by any combination of a baseband controller, RF IC, power amplifier, and envelope tracking power supply, and other circuitry. Accordingly, the logic 200 may map to one or more portions of the communication interface 112 and the system logic 114.

In the example in FIG. 2, the logic 200 includes a baseband controller 202, a power amplifier (PA) driver 204, a power amplifier (PA) 206, and a duplexer 208. Signal adaptation logic 210 is also present, and may be implemented as digital pre-distortion (DPD) controller 250 that determines and provides distortion estimates to an actuator 254. The actuator 254 may be implemented as a lookup table that pre-distorts the baseband I and Q signals, x(t), to obtain x'(t), so that the estimated amplitude-to-amplitude modulation (AM/AM) and amplitude-to-phase modulation (AM/PM) effects that the PA 206 subsequently applies to x'(t) result in a linear system.

The DPD controller 250 may include a measurement engine 252 and a processor 256 that receive and analyze the measurements y(t) from the feedback receiver 240. This may be done, e.g., on a bin by bin basis according to input amplitude. The DPD controller 250 determines an adaptation to the transmit signal samples x(t), and commands the actuator 254 to make the adaptations to the transmit signal samples. The adaptations may be compensating gains as described in detail below, and the net effect of the signal adaptation logic 210 may be to linearize the output of the PA 206.

As will be explained in more detail below, the signal adaptation logic 210 may modify the transmit signal samples, x(t), generated by the baseband controller 202, prior to generation of the preamplifier output signal Vpa that drives the PA 206. The PA driver 204 acts as a driver in the sense that it provides a first stage of amplification of an RF signal to drive the input of the PA 206. The PA driver 204 may, for example, produce a wide range of output powers for further amplification by the PA 206. The range of transmit powers may be, as one example, −40 dBm to +23 dBm at the antenna 212, with the PA 206 able to provide up to some nominal amount of gain, e.g., up to 26-30 dBm of gain. The PA driver 204 may be part of an RFIC between the baseband controller 202 and the PA 206, and the RFIC may also include an upconversion section 222, filters, and other processing logic.

The upconversion section 222 may center the signal to be transmitted at a particular center frequency Fc. Different center frequencies for transmitting and for receiving may be specified over a control channel by the network controller 150 (for example), and may be internally generated by a frequency synthesizer 224 for upconversion and downconversion in the logic 200. The upconversion section 222 may implement a processing flow for the input signal samples that includes, as examples, a pre-emphasis or baseband gain stage, I and Q DACs, analog filters, and mixers for upconversion to Fc. Pre-amplification by the PA driver 204, and power amplification by the PA 206 follow the upconversion section 222.

The duplexer 208 may implement a transmit/receive switch under control of the system logic 114, e.g., under control of the baseband controller 202. In one switch position, the duplexer 208 passes amplified transmit signals from the PA 206 through the antenna 212. In a different switch position, the duplexer 208 passes received signals from the antenna 212 to the receive path 230 for further processing.

The baseband controller 202 may be part of the system logic 114. The baseband controller 202 provides, e.g., inphase/quadrature (I/Q) signal samples of a desired transmit signal to the modulus logic 214. The modulus logic 214 may output the absolute value (e.g., the square root of I squared plus q squared) of the transmit signal to a shaping table 216. The shaping table 216 maps input values to output values in a linear or non-linear manner. The output of the shaping table 216 feeds the digital to analog converter (DAC) 218. In turn, the DAC 218 outputs the envelope of the transmit signal as modified by the shaping table as a reference input signal to the envelope tracking (ET) power supply 220. Said another way, the shaping table 216 implements a non-linear mapping between the modulus of the signal to be transmitted and the voltage that appears at the output of the DAC 218, to which the ET switcher is responsive.

The shaping table 216 may be implemented in many ways. For example, the shaping table 216 may be a lookup table implemented in software or hardware, as part of the baseband controller 202, or as a separate circuit. The shaping table 216 may include, for instance, 64 or 128 table data set values that represent an input/output relationship for mapping input signal values to output signal values. The shaping table implementation may perform linear or non-linear interpolation between specific data set values, for any input signal value that does not exactly correspond to one of the sample points having a specific data set value in the shaping table 216. In other implementations, the shaping table 216 may be implemented as program instructions that calculate the output value as a function of input signal value according to any desired input to output relationship curve.

Configuration interfaces 226 and 228, e.g., serial or parallel data interfaces, control pins, or other interfaces, may be provided to configure the shaping table 216 and the ET 220, or other parts of the logic 200. The configuration interfaces 226 and 228 may be Mobile Industry Processor Interface (MIPI) Alliance specified interfaces or other types of interfaces.

An envelope tracking power supply (ET) 220 receives the reference envelope signal from the DAC 218. The ET 220 may output a PA power supply voltage signal that approximately follows the envelope signal and that may include a variable amount of headroom above the envelope signal. The PA power supply voltage signal, Vet, provides power to the PA 206 for driving the antenna 212 with the transmit signal that results from amplifying the PA 206 input, Vpa.

The content and form of Vpa and Vet reflect the implementation of a shaping table 216 that implements unequal (non-iso) gain compression in the PA 206 across a range of transmit signal amplitudes. Further, in some implementations, a feedback receiver 240 provides feedback information to the baseband controller 202 for making decisions about how to generate Vpa and Vet. In particular, the feedback information may influence the shape of the shaping table 216, and the adaptations applied by the signal adaption logic 210.

A directional coupler 232 is part of a sensed signal path 238 that provides a sensed signal input to the feedback receiver 240. The directional coupler 232 is responsive to transmission by the PA 206 through the antenna 212. Specifically, the directional coupler 232 couples a portion of the transmitted signal onto the sensed signal path 238 for processing by the feedback receiver 240. In other words, the sensed signal arises from transmission of the outgoing signal driven through the antenna 212.

The feedback receiver 240 may be implemented in many different ways. For example, the feedback receiver 240 may include an amplifier or buffer 242 and a downconversion section 244. The feedback receiver 240 may also include a filter 246 and an ADC 248. The ADC 248 outputs digital signal samples, y(t), of the sensed signal obtained by the directional coupler 232. The digital signal samples provide a measurement of the outgoing signal, which is the actual signal transmitted through the antenna 212. The baseband controller 202 may then analyze y(t) as part of an analysis for establishing the shaping table 216 or adaptions by the signal adaptation logic 210. In the logic 200, a switch 250 may be provided and controlled by the switch control output 252 from the baseband controller 202. In the forward position, the switch 250 couples the forward signal into the sensed signal path 238. The baseband controller 202 may then determine a forward transfer function. Then in the reflected position, the switch 250 couples the reflected signal to the sensed signal path 238 for determining the reflected transfer function.

The feedback receiver 240 may measure the signal at the PA output and compare the signal to the desired output signal. The measurement may be done as a function of amplitude, placing the measurements into bins, for example 64 to 128 bins. The measurements capture the input to output relationship. The, the baseband controller 202 or adaptation logic 210 may analyze the relationship and determine whether more or less compression is present than desired, and if so, compensate to reach the desired level of compression. As will be described in more detail below, in one implementation, there may be little to no compression for large signal swings, and compression (e.g., 2 to 3 dB) for smaller signal swings. The baseband controller 202 or signal adaptation logic 210 may analyze the feedback obtained from the feedback receiver 240 at any desired rate or interval.

Note that the logic 200 may support a wide range of output powers. The output power employed at any particular time may be specified by the network controller 150, for example. In some implementations, the logic 200 may generate output powers at the antenna 212 between −40 dBm and +23 dBm. As noted above, the duplexer 208 may separate the transmit path and receive path, and in doing so introduces some power loss, typically on the order of 3 dBm. Thus, to achieve 23 dBm output power at the antenna 212, the PA 206 produces approximately a 26 dBm outgoing signal. Doing so, however, consumes a significant amount of power due to inefficiencies in the components of the logic 200.

In particular, the PA 206 may be on the order of 40% efficient. Accordingly, the PA 206 would consume almost 1 W of power to apply a 26 dBm gain (about 400 mW) to a 0 dBm input signal driving the PA 206. Further, although providing excellent linearity, the PA driver preamplifier 204 may be only 5%-8% efficient. Accordingly, it may require as much as 20 mW of power for the preamplifier to deliver a 0 dBm (1 mW) RF drive signal to the PA 206. As another example, a 2 dBm output from the PA driver 204 might then consume as much as approximately 32 mW of power. Given these relative efficiencies and the tradeoffs in applying gain at different points in the logic 200, and given that the output of the PA is a function of both Vet and Vpa, certain techniques are described below that result in significant power savings for the device 100.

In particular, the logic 200 may implement a shaping table 216 that causes unequal (non-iso) gain compression of the PA 206 across a range input signal amplitudes to the PA 206. The non-iso gain compression is in contrast to a shaping table that implements equal (iso or constant) gain compression for the PA 206. For example, an iso gain compression shaping table might result in a constant gain compression of 2 dBm across a range of input signal amplitudes to the PA 206.

Figure 3:
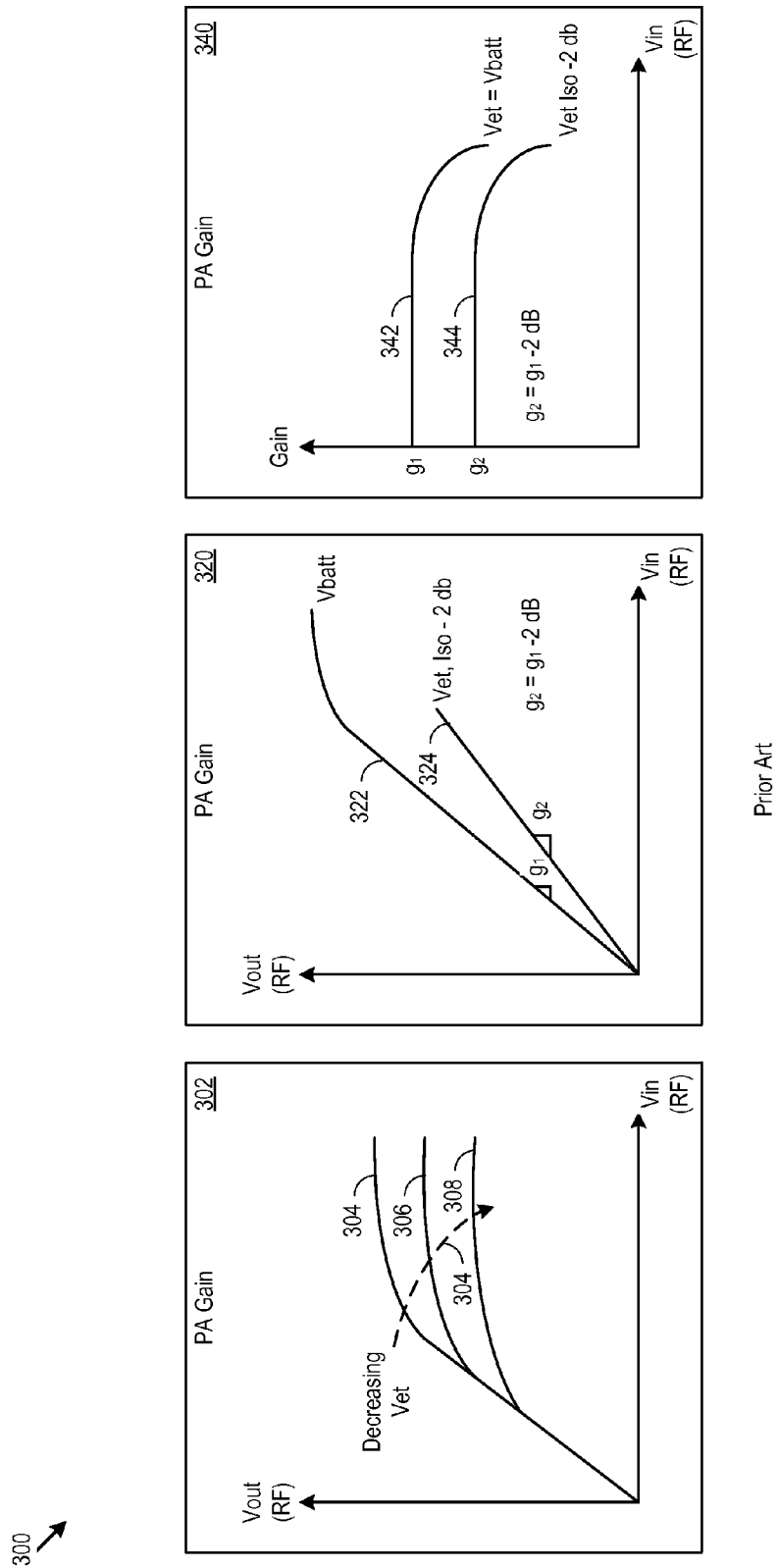
FIG. 3 shows example performance curves for a power amplifier.

FIG. 3 shows example performance curves 300 for a power amplifier. The curve set 302 shows the effect on the PA gain with decreasing Vet 304. Generally speaking, as Vet increases, the gain of the PA 206 increases, and the PA 206 stays linear longer before going into compression as the amplifier saturates (and additional input yields little to no additional output). This is shown in FIG. 3 by the gain curves flattening out with increasing input signal amplitude. Thus, for instance, the Vet curve 304 allows the PA 206 to achieve a greater gain then the Vet curve 306, which in turn allows the PA 206 to achieve a greater gain than the Vet curve 308. The Vet curve 304 may, for example, be associated with providing the full DC battery voltage in the UE 100, Vbatt, to the PA 206 as a power supply voltage.

The curve set 320 illustrates another view of PA gain. In particular, the gain curve 322 shows the small signal gain, g1, achieved by the PA 206 for a particular Vet, in this case Vet=Vbatt. On the other hand, the gain curve 324 shows the small signal gain, g2, achieved by the PA 206 for an iso gain shaping table. The iso gain shaping table causes the ET power supply to output a Vet<Vbatt to the PA 206, and controls Vet such that the PA gain is 2 dB less than the nominal gain curve 322 across the range of transmit signal amplitudes. That is, g2=g1−2 dB at all points along the small signal response of the gain curve.

Therefore, the gain curve 324 provides the same (iso) amount, 2 dB, less gain from the PA 206 than the gain curve 322, where for Vet=Vbatt. To implement iso gain compression, the baseband controller 202 may setup the input/output relationship in the shaping table 216 to constrain the reference envelope tracking signal provided to the ET power supply 220. As a result, the ET power supply correspondingly constrains the power amplifier voltage supply signal, which results in compression in the PA gain (e.g., by 2 dB). Said another way, the gain curve 324 implements iso compression (of 2 dB in this example) in the PA 206 compared to the gain curve 322. This sense of the word compression is different than the sense used with respect to the curve set 302, where compression referred to the flattening of the gain curve for large input voltages.

FIG. 3 also shows a curve set 340. In the curve set 340, the gain g1 is shown as gain curve 342, provided by Vet=Vbatt. The gain g2 is shown as the gain curve 344, provided by Vet<Vbatt. Note that g2 is 2 dB less gain than g1 across the small signal input range to the PA 206. As with any Vet and any amplifier (due to saturation), both gain curves 342 and 344 flatten out as the signal input to the PA 206 increases to larger levels.

Figure 4:
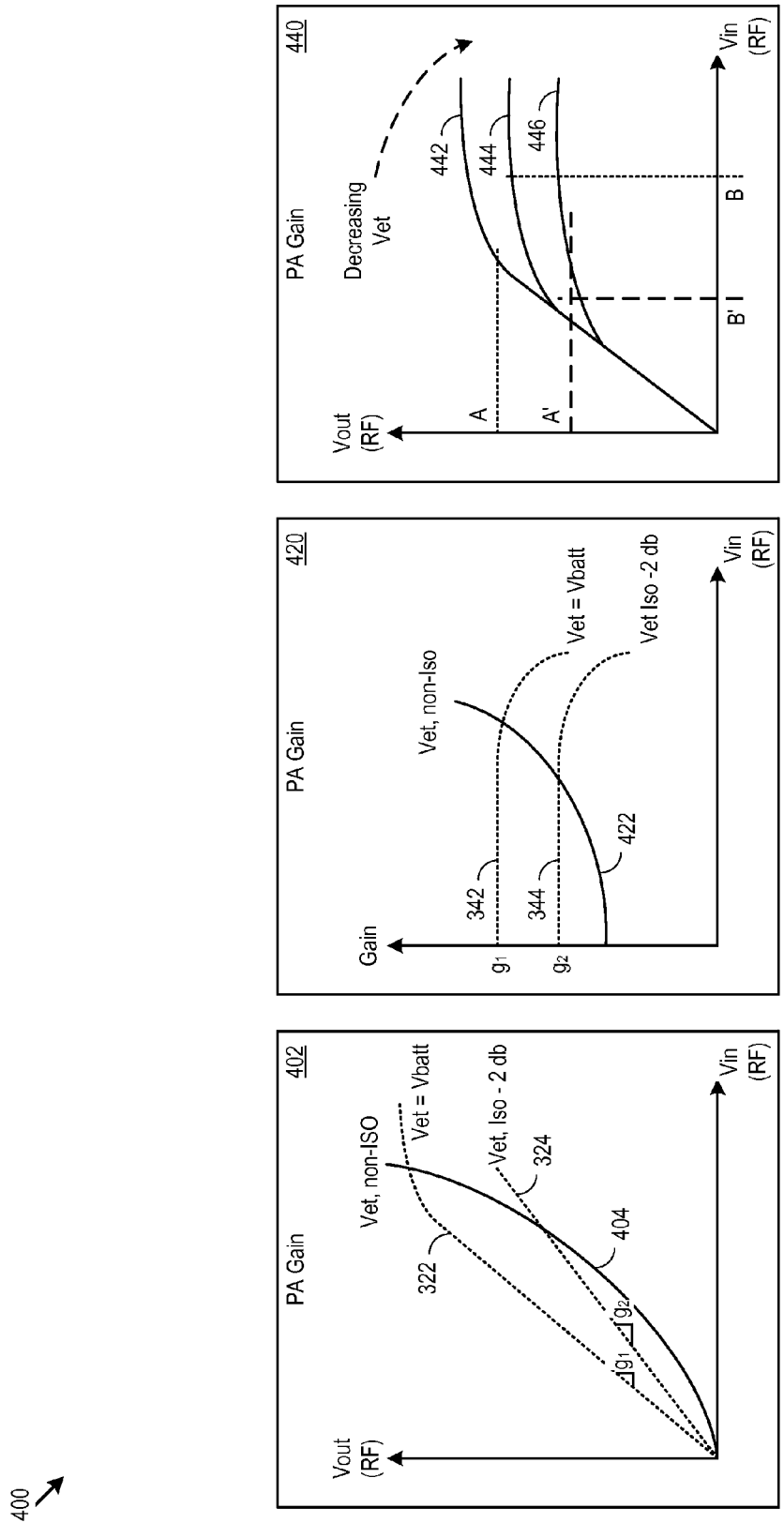
FIG. 4 shows example performance curves for non-iso gain compression.

FIG. 4 shows example performance curves 400 for non-iso gain compression. The curve set 402 shows, for reference purposes, the gain curve 322 for which Vet=Vbatt and the gain curve 324 for which Vet<Vbatt, with iso gain compression of about 2 dB. The curve set 402 also shows a non-iso gain curve 404. The baseband controller 202 may establish an input/output relationship in the shaping table 216 that implements the non-iso gain curve 404. The curve set 420 shows another view of non-iso gain. In particular, the gain curve 422 illustrates the non-constant nature of the PA gain that results from implementation of the non-iso gain curve 404. The non-iso gain shaping table causes PA gain that varies with input signal amplitude; the PA gain is not constant across any given range of input signal amplitudes.

In more detail, with reference to the non-iso gain curve 404, that curve results in less gain out of the PA 206 for some input signals than for others. In particular, for relatively small input signals, the gain is less, while for larger input signals, the gain is greater. Note, however, that the UE 100 typically needs to meet a particular commanded output power at the antenna 212. For that reason, when less gain is made available to the PA 206 at small signal levels, the gain may be increased elsewhere in the transmit path to compensate. As one specific example, the signal adaptation logic 210 may boost the I/Q digital signal samples, x(t), to compensate for the lower gain out of the PA 206 caused by the non-iso gain compression. The result is to linearize the gain across a range of transmit signal amplitudes to the PA 206, and thereby produce the requisite output power at the antenna 212, regardless of the effect of the non-iso shaping table 216 on PA gain.

The non-iso gain compression has the effect of reducing the PAPR (peak to average power ratio) of the signal input to the PA driver 204 and of Vpa because small signals are boosted and large signals are not boosted and stay about the same. There is a corresponding reduction in dynamic range because additional swing out of the PA driver 204 is not needed large signals. At the same time, there is aggressive power savings by reducing the power amplifier voltage supply signal, Vet, for small signals. For those small signals, there is authority in the PA driver 204 to boost them up digitally to compensate for the reduction in gain in the PA 206. That is, the PA driver 204 is designed to produce some maximum amount of output power, and has the ability to boost a certain range of signals without running into the limit on its output power. Accordingly, power is saved by reducing the PA gain for small signals, and making up for the reduction in gain in the PA driver 204.

To give a numerical example, assume that the UE 100 needs to produce 23 dBm at the antenna 212, which requires 26 dBm output at the PA 206 due to a 3 dBm loss in the duplexer 208. Assume first a 2 dB iso gain compression, down from a nominal 28 dBm with the full Vet=Vbatt as a supply voltage. The PA driver 204 produces a 0 dBm output at a cost of about 20 mW (assuming 5% efficiency), and the PA 206 gain is 26 dBm at a cost of about 1000 mW (assuming 40% efficiency), for a total of 1020 mW. With a non-iso shaping table, however, when the signal magnitude is small, the non-iso shaping table aggressively compresses the Vet, which reduces PA gain. The same output power, 26 dBm is still needed, however. For the sake of example, assume that the aggressive compression results in a PA gain of 20 dBm instead of 26 dBm. Then, the PA 206 produces 20 dBm at a cost of about 250 mW, and the signal adaptation logic 210 boosts the small signal values so that PA driver produces 6 dBm at a cost of about 80 mW, or a total of 330 mW for the same output power.

Note that with iso gain compression, the PA driver 204 needs to supply high output powers at the highest input voltages to the PA 206. One result is that the PA driver 204 typically needs to be designed with additional headroom, resulting in an upsized PA driver 204 that consumes additional power. As explained above, the PA driver 204 may have very low efficiency. As a result, obtaining an extra 2 dB of gain to overcome the 2 dB compression resulting from an iso gain shaping table, could cost 20 to 30 mw or more. In other words, with iso gain compression affecting all output power levels, including the highest output power levels, the transmit chain needs, in effect, an extra 2 dBm out of the PA driver 204, which is relatively inefficient and costly in terms of power consumption. In contrast, the non-iso gain shaping table may, for large signal swings, result in a Vet that causes little or no compression in the PA 206. This means that the PA driver 204 does not need to consume the power needed to compensate for the PA gain compression resulting from iso gain compression that would otherwise be present at all signal amplitudes, including the large signal swings.

The non-ISO gain shaping table may implement decreasing PA gain compression as the input voltage swing increases. A typical LTE transmitter delivers 23 dBm to the antenna. The ET and DPD techniques may be employed, for example, over about the top 6 to 10 dB of output power. Accordingly, in some implementations, the logic 200 employs the non-ISO gain techniques from power levels of about 13-17 dBm to 23 dBm. However, any system may be configured to employ these techniques over larger or smaller ranges of output power.

For the highest swings, the non-iso gain shaping table may result in no compression in the PA 206. For such output powers, the shaping table may allow the reference voltage input to the ET power supply 220 to increase such that the ET power supply 220 places, e.g., a Vet associated with the full Vbatt across the PA 206 as the power supply voltage. As a result, the PA 206 can produce additional gain (e.g., 2 dB more than if iso gain compression were used), and the PA driver 204 does not need to make up the gain compression (e.g., 2 dB less) for large signal swings that would otherwise result from an iso-gain compression shaping table. Thus, digital pre-distortion or other forms of signal adaptation need not be used for the larger signal inputs.

On the other hand, consider the effect of the non-iso gain compression for smaller input signals. The non-iso gain shaping table results in less gain out of the PA 206, and a significant reduction in power is achieved; that is, the PA 206 is more aggressively compressed at low transmit signal amplitudes. To compensate and to achieve the same required output power, the signal adaptation logic boosts the digital transmit signals so that the PA driver 204 compensates for the reduced gain out of the PA 206. Note that for the smaller input voltage swings, the PA driver 204 will have enough authority to produce the gain compensated output to drive the PA 206 harder, to produce the required output power.

The input/output relationship in the shaping table 216 that results in non-iso gain compression may be found by an analytical computer search and simulation, for example, according to desired goal criteria. As one example, the goal criteria may include minimizing power consumption. Another goal may include meeting spectral emission requirements.

In one implementation, the non-iso shaping table may establish a Vet for the PA 206 of the form:

$$V_{ET} = f(V_{min}, k, |V_{in}|)$$

and, in particular:

$$V_{ET} = (V_{min}^P + k|V_{in}|^P)^{\frac{1}{P}}$$

Where Vmin is the minimum input voltage considered, Vin is the input voltage, k is a constant, and P is the power of the norm, and in the case of P=2, corresponds to the root mean square (RMS). This form of Vet provides a smooth slowly varying signal near the origin and prevents abrupt changes. Further, for large values of Vin large compared to Vmin, it is still non-linear, but follows an approximately linear relationship. As noted above, the input/output relationship for the non-iso shaping table that creates a Vet of this form may be found by, e.g., computer search over the parameters of the model: Vmin, K and P.

Referring again to FIG. 4, the normal gain response curves of the PA 206 may establish parameter ranges over which the tradeoffs operate between gain in the baseband and PA driver 204, and in the PA 206. The curve set 440 shows example gain curves for the PA 206 for different Vet supply voltages. If output power A is required at the antenna 212, then if Vet is too small (e.g., Vet 444 or Vet 446), no amount of signal boost, B, from the signal adaptation logic 210 and PA driver 204 will allow the PA 206 to reach that output power. Similarly, the PA driver 204 may have a limit on output power. Accordingly, for example, when the output power A' is needed at the antenna 212, and Vet 446 is supplied to the PA 206, if the PA driver 204 output is limited to B', then the output power A' cannot be reached. The curve set 440 helps to illustrate why the UE 100 typically cannot run with minimal Vet in all circumstances. However, within this parameter space, the tradeoffs between gain in the baseband (and thus the PA driver 204) and in the PA 206 are managed with the non-iso shaping table and signal boost in the baseband to, e.g., minimize power consumption.

Figure 5:
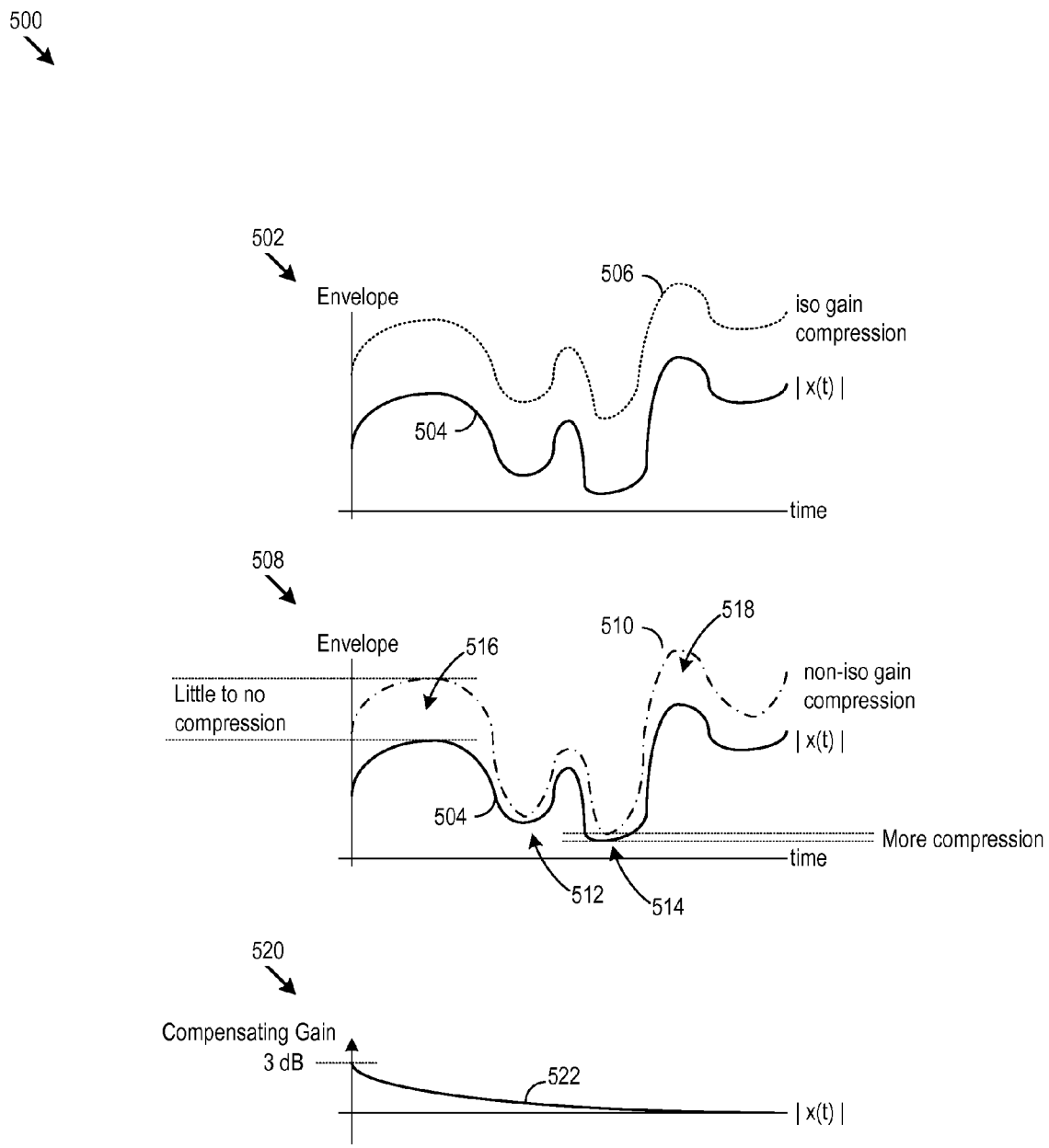
FIG. 5 shows waveform examples for non-iso gain compression.

FIG. 5 shows exaggerated waveform examples 500 for non-iso gain compression. In FIG. 5, the example 502 shows the modulus of the transmit signal: |x(t)| 504. Under iso gain compression, the shaping table causes an equal amount of gain compression in the PA 206 across all input signal amplitudes. The resultant Vet is shown as curve 504. In the example 508, the same transmit signal 504 is shown. However, the Vet resulting from non-iso gain compression by the shaping table 216 is also shown, as the Vet curve 510. Note that the Vet curve 510 aggressively compresses the PA 206 for smaller signal swings (e.g., at points 512 and 514), and provides little to no compression for larger signal swings (e.g., at points 516 and 518).

In the logic 200, the signal adaptation logic 210 compensates for the reduction in gain in the PA 206 for smaller signal swings. In particular, the signal adaptation logic 210 may boost the digital signal such that, out of the PA driver 204, the signal driving the PA 206, Vpa, is increased, so that the net effect of the boost and the reduction in gain in the PA 206 result in the same desired output power. In other words, the reduction in gain in the PA 206 is linearized by the action of the signal adaptation logic 210. FIG. 5 also shows an example 520 of a gain compensation curve 522. The gain compensation curve 522 shows the compensating gain applied by the signal adaptation logic 522 as a variation of input signal amplitude. As shown, the compensating gain is greatest for the smallest signals (because the PA 206 is most compressed for those signals), and decreases to little or no gain for the largest signals (because the PA 206 is least compressed, or not compressed for those signals). In fact, as discussed above, the PA 206 may be given up to the full power supply voltage (e.g., Vbatt) as its supply voltage for larger signal swings. This in turn increases the PA gain for large signals, and reduces or eliminates the need for gain to be applied in the baseband section or generated by the PA driver 204. Further, while the example in FIG. 5 shows 3 dB of gain applied for the smallest signal swings, the particular gains applied, and the shape of the gain compensation curve 522 may vary according widely across different implementations, and according to the particular non-iso shaping table used and its effect on PA gain.

Figure 6:
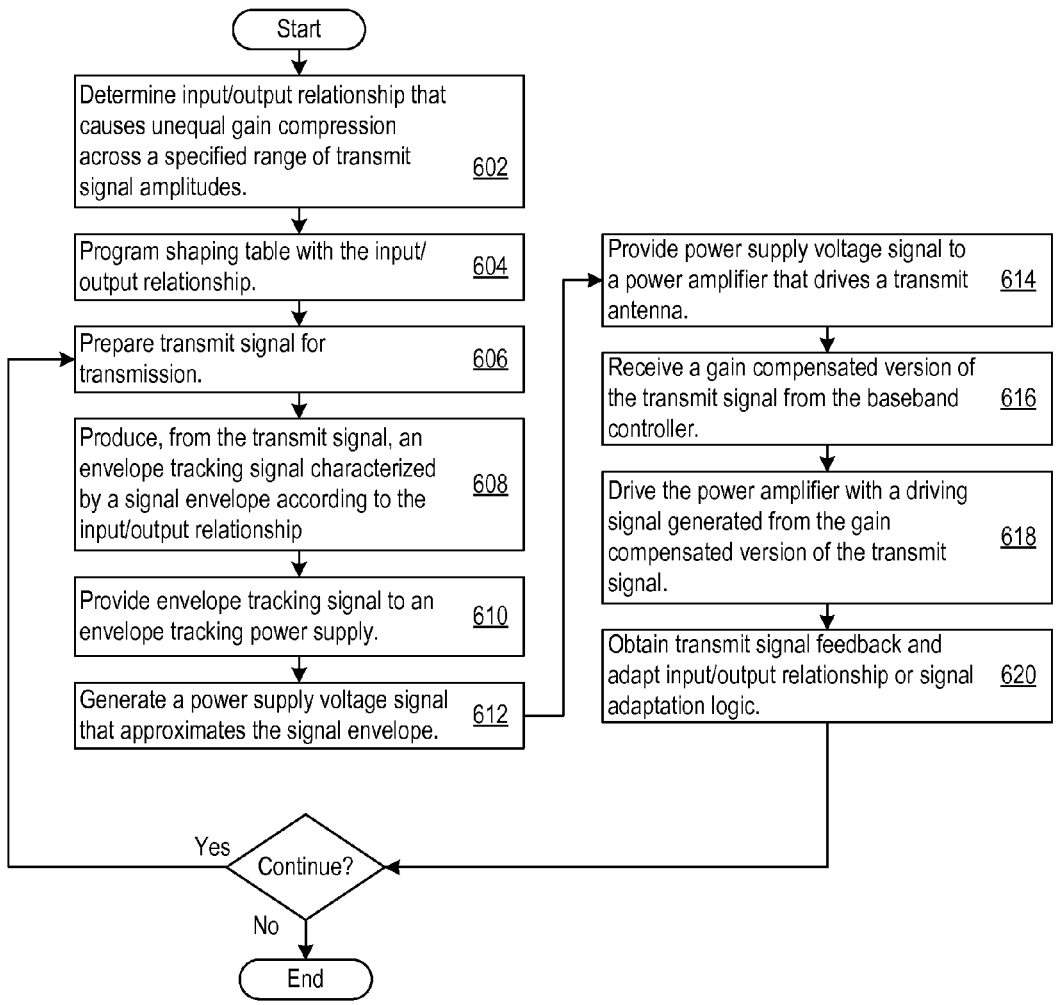
FIG. 6 shows a flow diagram of logic for non-iso gain compression.

FIG. 6 shows logic 600 that a system may implement to perform non-iso gain compression. The logic 600 determines an input/output relationship that causes unequal gain compression across a specified range of transmit signal amplitudes (602). The logic 600 programs a shaping table with the input/output relationship (604) and prepares a transmit signal for transmission (606). The logic 600 applies the transmit signal to the shaping table to produce, from the transmit signal, an envelope tracking signal characterized by a signal envelope according to the input/output relationship (608).

The logic 600 also provides the envelope tracking signal to an envelope tracking power supply (610). An output a power supply voltage signal that approximates the signal envelope is thereby generated (612). The power supply voltage signal is provided to a power amplifier that drives a transmit antenna (614). In an RF driver, for example, between the baseband controller and the power amplifier, the RF driver may receive a gain compensated version of the transmit signal from the baseband controller (616). The RF driver may also drive the power amplifier with a driving signal generated from the gain compensated version of the transmit signal (618). The logic 600 may also obtain transmit signal feedback (e.g., using the feedback receiver 240) and adapt input/output relationship or signal adaptation logic (620).

Figure 7:
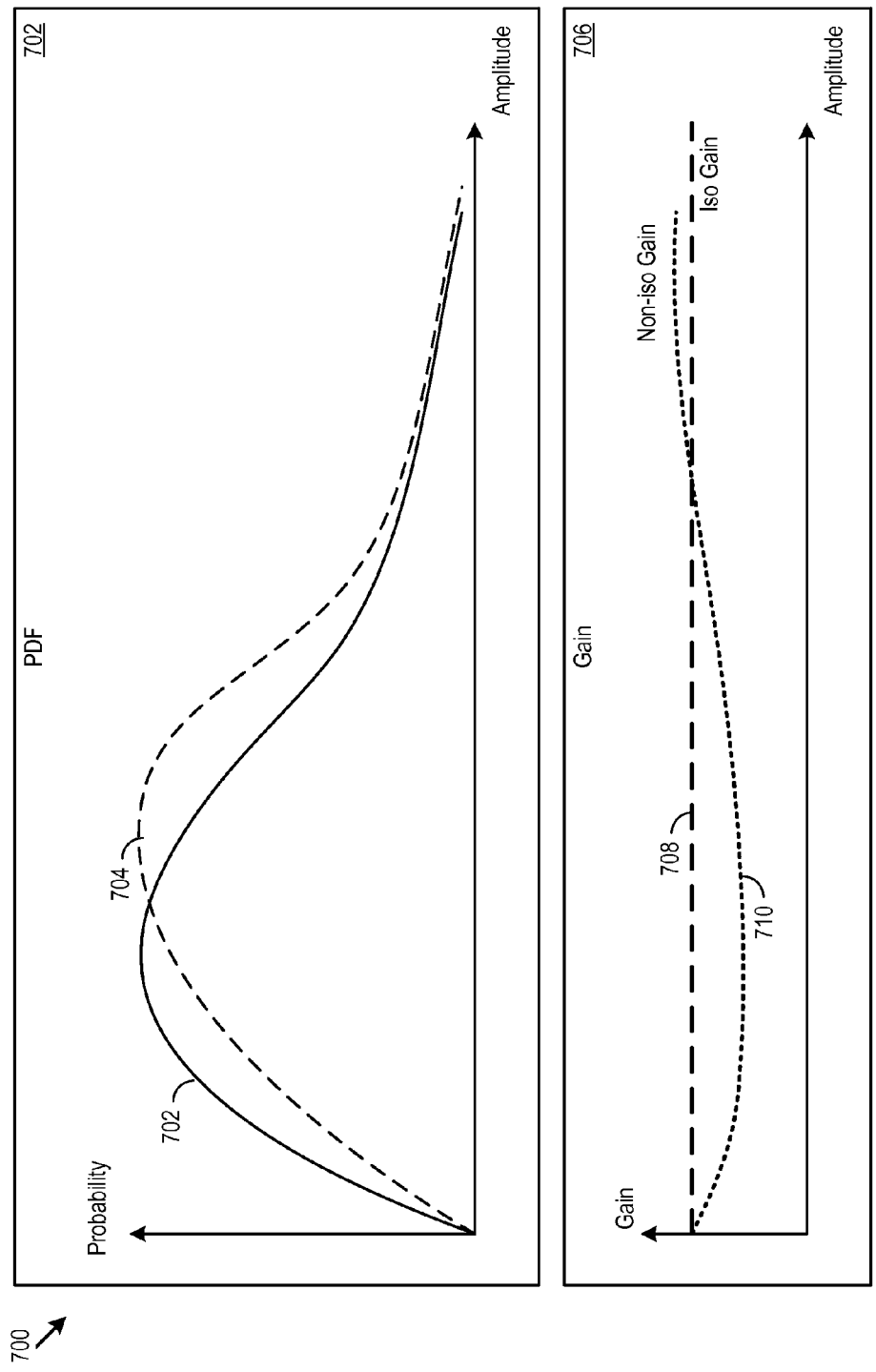
FIG. 7 shows how the probability density function of an input signal may change by pre-distortion to adapt for non-iso gain compression.

FIG. 7 shows an example 700 of shows how the probability density function (PDF) of an input signal may change by pre-distortion to adapt for non-iso gain compression. The PDF curve 702 shows an example PDF of the transmit signal amplitude values prior to pre-distortion. Note that there may be a significant amount of relatively low level signal amplitudes. As explained above, the system increases the gain compression in the PA 206 for such amplitudes, and compensates by applying gain to lower amplitude components of the transmit signal. As a result, the PDF of the transmit signal may shift to show a greater probability of higher amplitude components, e.g., as shown in the shifted PDF curve 704.

FIG. 7 also shows a view 706 of the differences between iso-gain 708 and non-iso gain 710. The non-iso gain 710 provides relative less gain for the PA 206 compared to the iso gain 708, for relatively small signal amplitude. For larger signal amplitudes, the non-iso gain 710 increases to provide little or no gain compression in the PA 206. In that respect, the non-iso gain 710 may rise above what the iso gain 708 provides, as the non-iso gain 710 is not limited (as with an iso gain) by always being, e.g., 2 db less than the nominal gain of the PA 206.

Normally power amplifiers are compressive in nature. This means that the input signal that passes through the PA experiences nominal gains when the input amplitude is closer to the RMS of the signal. However, when the input signal is large, the PA will compress the input signal. This can be characterized as a reduced gain near the peak of signal. Digital pre-distortion (DPD) applies AM/AM and AM/PM correction to compensate for the PA characteristics. In order to compensate the compressive characteristic of the PA, the DPD introduces a large amplification of the signals near the peak of the input signal. This correction amplifies the peaks of the input signal, and effectively increases the Peak to Average Power Ratio (PAPR) of the signal.

However, the non-iso gain approach modulates the gain of the PA 206 by controlling the shaping table 216 of the ET power supply 220. This approach allows the PA to have additional gain near the peaks of the input signal, while limiting the gain of the PA 206 near the RMS level of the input signal. This approach has two distinct advantages. First it allows the PA 206 to operate more efficiently near the highest point of the probability density function of the input signal. This maximizes the power savings achieved using the ET 220. There is no loss of overall efficiency due to the added gain at higher signal levels, because, statistically, occurrence of the input signal near the large amplitudes is very low.

The second advantage is that when the DPD is added in concert with the non-iso shaping table, the effect of the DPD is to amplify signals near the RMS level of the RF input signal. This increases the RMS level of the pre-distorted signal. However, since the pre-distortion is not required to add additional gain near the peak of the signal, the input signal peak amplitude is not increased. There is therefore the benefit of increasing the RMS level of the signal without altering its peak value. As a result, the peak to average power ratio of the signal after pre-distortion is reduced compared to the PAPR of the original signal.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
 a shaping table configured to produce, from an input signal, an envelope tracking signal characterized by a signal envelope;
 envelope tracking power supply circuitry configured to:
  receive the envelope tracking signal; and
  produce a voltage supply signal for an amplifier that approximates the signal envelope; and
 a controller configured to:
  establish an input/output relationship for the shaping table that is configured to cause unequal gain compression for the amplifier across a range of transmit signal amplitudes of a transmit signal, the unequal gain compression comprising higher gain compression for the amplifier for lower transmit signal amplitudes in the range, compared to greater transmit signal amplitudes in the range.

2. The system of claim 1, further comprising:
signal adaptation circuitry configured to provide a boost to the transmit signal at the lower transmit signal amplitudes.

3. The system of claim 2, where the signal adaptation circuitry comprises digital pre-distortion circuitry.

4. The system of claim 2, where the boost is configured to compensate for the higher gain compression.

5. The system of claim 2, where the boost is configured to linearize the unequal gain compression.

6. The system of claim 1, further comprising:
signal adaptation configured to provide a variable boost to the input signal that decreases moving from lower transmit signal amplitudes to higher transmit signal amplitudes.

7. The system of claim 6, further comprising:
a power amplifier driver prior to the amplifier that is configured to provide a radio frequency drive signal to the power amplifier that includes the variable boost.

8. A system comprising:
a shaping table configured to convert an input signal into an envelope tracking power supply reference signal; and
a controller configured to implement an input/output relationship in the shaping table such that the envelope tracking power supply reference signal causes unequal gain compression across a specified range of transmit signal amplitudes, the unequal gain compression comprising higher gain compression for lower transmit signal amplitudes in the range, compared to greater transmit signal amplitudes in the range.

9. The system of claim 7, further comprising:
a preamplifier in communication with the controller and configured to compensate for the unequal gain compression.

10. The system of claim 8, further comprising:
a preamplifier in communication with the controller and configured to compensate for the unequal gain compression by driving a transmit amplifier harder where the unequal gain compression is greater.

11. The system of claim 8, further comprising:
signal adaptation circuitry configured to digitally boost to the input signal to compensate for the unequal gain compression.

12. The system of claim 8, further comprising:
signal adaptation circuitry configured to digitally boost the input signal to linearize the unequal gain compression.

13. The system of claim 8, where the unequal gain compression comprises:
decreasing gain compression from lower transmit signal amplitudes in the range to higher transmit signal amplitudes in the range.

14. The system of claim 13, further comprising:
signal adaptation circuitry configured to digitally boost to the input signal to compensate for the decreasing gain compression from lower to higher transmit signal amplitudes.

15. The system of claim 13, further comprising:
a radio frequency driver for an amplifier, the radio frequency driver in communication with the controller and configured to compensate for the unequal gain compression by driving the amplifier harder as the gain compression increases.

16. A system comprising:
a shaping table configured to produce, from an input signal, an envelope tracking signal characterized by a signal envelope;
envelope tracking power supply circuitry configured to:
receive the envelope tracking signal; and
produce a voltage supply signal for an amplifier that approximates the signal envelope; and
a controller configured to:
establish an input/output relationship for the shaping table that is configured to cause unequal gain compression for the amplifier across a range of transmit signal amplitudes of a transmit signal, the unequal gain compression comprising lower gain compression for the amplifier for selected higher transmit signal amplitudes in the range, compared to lower transmit signal amplitudes in the range.

17. The system of claim 16, further comprising:
signal adaptation configured to provide a variable boost to the input signal that decreases moving from lower transmit signal amplitudes to higher transmit signal amplitudes.

18. The system of claim 17, further comprising:
a power amplifier driver prior to the amplifier that is configured to provide a radio frequency drive signal to the power amplifier that includes the variable boost.

19. The system of claim 16, where:
the controller comprises a baseband controller;
the shaping table is further configured to implement the input/output relationship; and
the system further comprises:
a power amplifier configured to receive the voltage supply signal and drive a transmit antenna; and
a radio frequency (RF) driver between the baseband controller and the power amplifier, the RF driver configured to:
receive a gain compensated version of the transmit signal from the baseband controller; and
drive the power amplifier with a driving signal generated from the gain compensated version of the transmit signal.

20. The system of claim 19, where:
the unequal gain compression comprises non-linearly decreasing gain compression as transmit signal amplitudes in the range increase; and
the system further comprises signal adaption circuitry configured to generate the gain compensated version of the transmit signal so that the gain compensated version of the input signal results in linearization of the non-linearly decreasing gain compression for transmissions through the transmit antenna.

* * * * *